(12) United States Patent
Beri et al.

(10) Patent No.: US 10,424,084 B2
(45) Date of Patent: Sep. 24, 2019

(54) DIGITAL CONTENT RENDERING THAT SUPPORTS ALPHA IS SHAPE (AIS) AS PART OF KNOCKOUT GROUPS

(71) Applicant: Adobe Inc., San Jose, CA (US)

(72) Inventors: Tarun Beri, Noida (IN); Harish Kumar, Noida (IN)

(73) Assignee: Adobe Inc., San Jose, CA (US)

( * ) Notice: Subject to any disclaimer, the term of this patent is extended or adjusted under 35 U.S.C. 154(b) by 97 days.

(21) Appl. No.: 15/582,196

(22) Filed: Apr. 28, 2017

(65) Prior Publication Data

US 2018/0315216 A1 Nov. 1, 2018

(51) Int. Cl.
| | |
|---|---|
| *G06T 11/00* | (2006.01) |
| *G06T 11/60* | (2006.01) |
| *G06T 15/40* | (2011.01) |
| *G06T 15/50* | (2011.01) |

(52) U.S. Cl.
CPC ............ *G06T 11/001* (2013.01); *G06T 11/60* (2013.01); *G06T 15/40* (2013.01); *G06T 15/503* (2013.01)

(58) Field of Classification Search
None
See application file for complete search history.

(56) References Cited

U.S. PATENT DOCUMENTS

| | | | | |
|---|---|---|---|---|
| 6,191,797 B1* | 2/2001 | Politis | ..................... | G06T 11/00 345/420 |
| 6,515,675 B1* | 2/2003 | Bourdev | .............. | G06T 15/503 345/592 |
| 8,638,341 B2* | 1/2014 | Kallio | ...................... | G09G 5/14 345/426 |
| 8,674,985 B2* | 3/2014 | Woo | ...................... | G06T 15/405 345/421 |
| 2006/0066637 A1* | 3/2006 | Hamburg | .............. | G06T 15/503 345/629 |
| 2008/0094395 A1* | 4/2008 | Woo | ...................... | G06T 15/405 345/422 |
| 2008/0094410 A1* | 4/2008 | Jiao | ....................... | G06T 15/503 345/592 |

(Continued)

OTHER PUBLICATIONS

"Enhancement of Depth Maps With Alpha Channel Estimation for 3-D Video", by Ji-Ho Cho, Kwan H. Lee, and Kiyoharu Aizawa, IEEE Journal of Selected Topics in Signal Processing, vol. 6, No. 5, Sep. 2012, pp. 483-494. (Year: 2012).*

(Continued)

*Primary Examiner* — James A Thompson
(74) *Attorney, Agent, or Firm* — SBMC (57) ABSTRACT

Digital content rendering techniques are described that support Alpha Is Shape (AIS) as part of a knockout group. In order to support AIS rendering of an object within a knockout group, an alpha-separated color value is generated by removing an effect of an alpha value of an object of a knockout group on a pixel. A color-blended color value is then generated by the GPU based on the alpha-separated color value and a color value associated with a backdrop of the knockout group for the pixel. A determination is also made as to an amount of spatial coverage for the pixel by comparing the object to the pixel. From this, a rendering color value is generated by the GPU based on the color-blended color value, the alpha value, and the amount of spatial coverage of the pixel by the object.

21 Claims, 7 Drawing Sheets

(56) References Cited

U.S. PATENT DOCUMENTS

2009/0102857 A1* 4/2009 Kallio .................... G06T 11/40
 345/611
2013/0120381 A1* 5/2013 Lau ........................ G06T 15/04
 345/423

OTHER PUBLICATIONS

"High-Quality Mipmapping Texture Compression With Alpha Maps for Graphics Processing Units", by Chih-Hao Sun, You-Ming Tsao, and Shao-Yi Chien, IEEE Transactions on Multimedia, vol. 11, No. 4, Jun. 2009, pp. 589-599. (Year: 2009).*

"Alpha Mapping in Scene Simulation of Launch Vehicle", by Jun Sun, Limei Xu, and Liangping Zhu, Proceedings of the 2006 IEEE International Conference on Mechatronics and Automation, Jun. 25-28, 2006, pp. 1757-1762. (Year: 2006).*

"Painter's algorithm—Wikipedia", Retrieved at: https://en.wikipedia.org/wiki/Painter%27s_algorithm—on Feb. 13, 2017, 2 pages.

* cited by examiner

DIGITAL CONTENT RENDERING THAT SUPPORTS ALPHA IS SHAPE (AIS) AS PART OF KNOCKOUT GROUPS

BACKGROUND

Knockout groups are used by a computing device to create graphical effects (e.g., "see-through" text) as part of rendering digital content. Objects that are members of a knockout group are rendered by the computing device such that the appearance of objects in the background that are overlapped by the objects in the knockout group is obscured, i.e., "knocked-out". Thus, objects in a knockout group do not permit visibility of objects in the background when rendered by a computing device that lie underneath the knockout group. This is in contrast to a transparency compositing model, where partially transparent objects permit visibility of background objects.

An object in a knockout group that completely covers, spatially, a pixel is rendered to obscure each object in the background of that same pixel. However, if the object in the knockout group partially covers a pixel, spatially, then the object only partially knocks-out background objects that share the same pixel. This means, for example, that when rendered by a computing device, an object in a knockout group that spatially covers 30% of a pixel contributes 30% of that pixel's color value. The remaining 70% of the pixel's color value originates from objects in the background. However, the actual amount of color from the object and the background depends on the rendering techniques employed.

Figure 2:
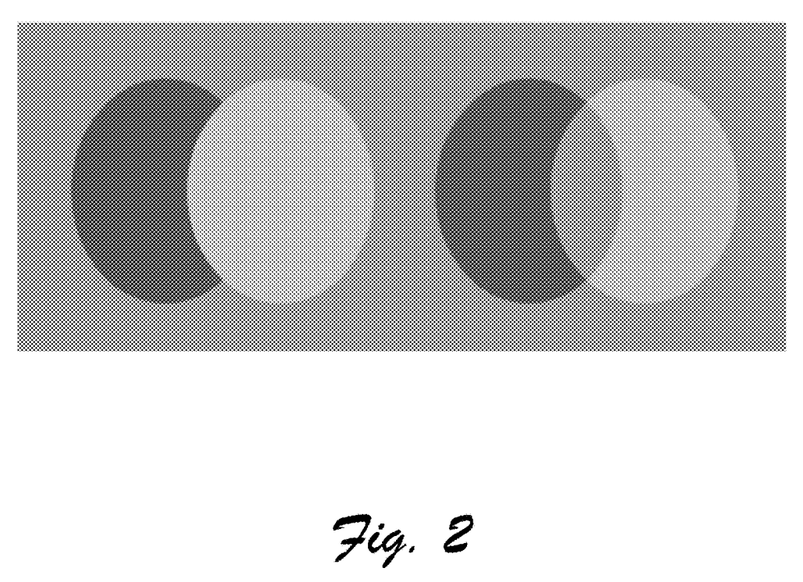
FIG. 2 depicts a system contrasting rendering of knockout groups in which a knockout group on the left-hand has AIS as set to "off" and a knockout group of the right-hand side has AIS as set to "on."

Alpha Is Shape (AIS) is used to support increased functionality as part of a knockout group to permit opacity of objects within a knockout group, which is referred to as "opacity coverage" in the following discussion. AIS is typically implemented as a Boolean flag that when turned on, causes objects within a knockout group bearing this flag to composite differently as compared to the case when AIS is off. FIG. 2 depicts examples of image rendering inside a knockout group with and without enabling AIS functionality. The left-hand side of FIG. 2 shows how a digital image is rendered when AIS is off, while the right-hand side shows a result of rendering of the same digital image when AIS is on. In the left-hand side in which AIS is off, the pixels of each of the ovals are completely opaque (having alpha equal to 1) and thus are rendered in a z-order (i.e., depth) such that the right oval completely obscures the left oval within the knockout group. In the right-hand side in which AIS is on, alpha also defines coverage (i.e., "shape") at each of the pixels, which is this case is an amount of opacity at each pixel. This is referred to as "opacity coverage" of a pixel by an object, i.e., an amount that the object is considered "see through." As a result, the pixels that form the overlapping portion between the ovals are partially opaque and thus permit at least a portion of the underlying oval to be viewed through the overlapping oval. Thus, AIS may be used to expand how objects are rendered as part of a knockout group by a computing device by addressing "opacity coverage" in addition to spatial coverage.

Conventional techniques that are implemented in GPUs for rendering knockout groups rely on MSAA (multi-sampled anti-aliasing). With MSAA, each pixel is separated into multiple sub-pixels (typically eight sub-pixels). The knockout spatial resolution is therefore limited to the number of such sub-pixels. In other words, if a sub-pixel is partially covered (spatially) by an object in a knockout group, then the sub-pixel is treated as fully covered and each of the objects underneath the sub-pixel are "knocked-out." Sub-pixels that are not covered by an object in a knockout group continue to show colors from objects underneath when rendered by a computing device. An increase to the number of sub-pixels under MSAA improves the resolution, but at the expense of increased memory usage and processing time.

Some conventional multi-sampling techniques use a depth buffer to maintain Z-ordering among objects in knockout groups. Maintenance of a Z-order supports a knockout requirement that each object inside a knockout group composites with the group's initial backdrop rather than the objects underneath. By maintaining Z-order, such knockout techniques require a GPU to track spatial pixel coverage of objects and knockout groups. Consequently, use of multi-sampling and a depth buffer has performance and memory implications making these conventional techniques inefficient when rendering complicated artwork. These performance implications are more pronounced while rendering content in CMYK color space which inherently requires more memory than in an RGB color space.

Additionally, there is no existing solution to render AIS objects on a GPU and thus existing GPU solutions are limited to rendering knockout groups without AIS, i.e., without an ability address "opacity coverage" within the knockout group as described above. This forces use of scanline algorithms by a conventional CPU to render AIS objects by a computing device, which suffer from poor computational performance.

SUMMARY

Digital content rendering techniques are described that support Alpha Is Shape (AIS) as part of a knockout group. In the techniques described herein, a graphics processing unit is configured to address AIS within a knockout group, which is not possible using conventional techniques. As a result, the techniques described herein may take advantage of computational and memory efficiency of a GPU in rendering of AIS, and further may do so without use of a depth buffer and multi-sampling and thus may further improve rendering efficiency.

In one example, a knockout group is identified by a graphics processing unit as having an attribute that specifies that an alpha value is used to define an amount of opacity coverage of a pixel of an object within the knockout group. In response, a texture is instantiated within a framebuffer of the GPU to maintain coverage of pixels (e.g., spatial and/or opacity coverage) by objects within the knockout group as well as other knockout groups, and thus avoids use of multi-sampling and depth buffers as required by conventional techniques.

In order to support AIS rendering of an object within a knockout group, an alpha-separate color value is generated by removing an effect of an alpha value of the object on the pixel. The alpha value is stored separately as a variable in memory of the GPU. A color-blended color value is then generated by the GPU based on the alpha-separated color value and a color value associated with a backdrop of the knockout group for the pixel. A determination is also made as to an amount of spatial coverage for the pixel by comparing overlap of the object with respect to the pixel. Thus, the amount of spatial coverage defines "how much overlap" the object has in relation to the pixel, which may also be stored as part of "coverage" maintained by the texture in the framebuffer of the GPU.

From this, a rendering color value is generated by the GPU based on the color-blended color value, the alpha value, and the amount of spatial coverage of the pixel by the object. This rendering color value is then output, e.g., for rendering in a user interface, storage in memory, and so forth. In instances in which the knockout group is a child of another parent knockout group, recorded coverage as part of the texture in the framebuffer of the GPU is accumulated to address AIS between these groups.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Digital content rendering techniques are described that support Alpha Is Shape (AIS) as part of a knockout group. In the techniques described herein, a graphics processing unit is configured to address AIS within a knockout group, which is not possible using conventional techniques. As a result, the techniques described herein may take advantage of computational and memory efficiency of a GPU in rendering of AIS, and further may do so without use of a depth buffer and multi-sampling and thus may further improve rendering efficiency over conventional techniques.

In one example, a knockout group is identified by a graphics processing unit as having an attribute that specifies that an alpha value is used to define an amount of opacity coverage of a pixel of an object within the knockout group, e.g., through use of a Boolean flag in which AIS is set to "on." In response, a texture is instantiated within a framebuffer of the GPU to maintain coverage of pixels (e.g., spatial and/or opacity coverage) by objects within the knockout group as well as other knockout groups, and thus avoids use of multi-sampling and depth buffers as required by conventional techniques.

In order to support AIS rendering of an object within a knockout group, an alpha-separated color value is generated by removing an effect of an alpha value of the object on the pixel. This may include removal of an alpha value from individual color channels (e.g., removal of "A" from RA, GA, BA) by dividing the color values of the channel (e.g., R,G,B) by respective alpha values "A". In an example in which color is not multiplied across the channels, an alpha value of the group as a whole is used.

A color-blended color value is then generated by the GPU based on the alpha-separated color value and a color value associated with a backdrop of the knockout group for the pixel. A determination is also made as to an amount of spatial coverage for the pixel by comparing overlap of the object in relation to the pixel. Thus, the amount of spatial coverage defines "how much overlap" the object has in relation to the pixel.

From this, a rendering color value (i.e., the "final" color value for the pixel from the knockout group) is generated by the GPU based on the color-blended color value (e.g., from the backdrop and alpha-separated color value), the alpha value (from storage in the framebuffer resulting from separation of the alpha-separated color value), and the amount of spatial coverage of the pixel by the object. This rendering color value is then output, e.g., for rendering in a user interface, storage in memory, and so forth. In instances in which the knockout group is a child of another parent knockout group, recorded coverage as part of the texture in the framebuffer of the GPU is accumulated to address AIS between these groups.

Example Terms

"Digital content" includes documents, digital images, and other content that is storable within computer-readable storage media. More generally, digital content that supports knockout groups and knockout behavior can be used in the following, including documents supporting a page description language (e.g., PDF), a vector graphics markup language similar to SVG (or EPS), or see-through (transparent or semi-transparent) text. The Portable Document Format (PDF) international standard ISO 32000 defines a digital form for representing electronic documents to enable users to exchange and view such documents independent of the environment in which they were created or the environment in which they are viewed and printed. A PDF document is a data structure composed of objects.

As used herein, the term "object" includes a sequence of operators and operands that describe the content and appearance of a document, such as text and graphics, encoded in a PDF format or a format similar to PDF that supports knockout behavior, such as SVG, AI, and INDD. PDF also includes objects (e.g., annotations and hypertext links) that are not part of the page content itself but are useful for interactive viewing and document interchange.

"Knockout group" refers to a group of objects (text, images, paths, etc.) encoded as part of digital content. Examples of which include a PDF or an encoded document that conforms to a specification derived from, or similar to, PDF or a document that supports knockout behavior. In a knockout group, each object is composited with an initial backdrop associated with the group rather than with objects in another preceding or underlying group of objects. An object's shape (at a pixel) is a fractional value from 0.0 to 1.0 which describe a range from no-coverage to full-coverage in this example. An object composited with the initial backdrop completely knocks out (completely obscures) the effect of earlier-rendered (i.e., underlying) objects within the same group at each pixel where the shape of the object is 1.0. In other words, for any given pixel, only the topmost object contributes to the final color and opacity of the pixel. An object composited with the initial backdrop partially knocks out (partially obscures) the effect of underlying elements within the same group at places where shape is less than 1.0. In other words, for any given pixel, the final color and opacity is a combination of the color and opacity of the topmost object and the underlying object. A spatial coverage value of 0.0 leaves the opacity and color values of the underlying object unchanged. Knockout groups are useful when composing graphics where the topmost object completely or partially obscures underlying objects while interacting with the group's backdrop in a usual manner A knockout group can be nested inside another knockout group or inside a non-knockout group. Similarly, a knockout group can nest other knockout and non-knockout groups. In such cases, spatial coverage values of objects carry knockout behavior outside an immediate parent group (to knockout groups placed higher in the hierarchy). Thus, partial shape data is maintained at the group level.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
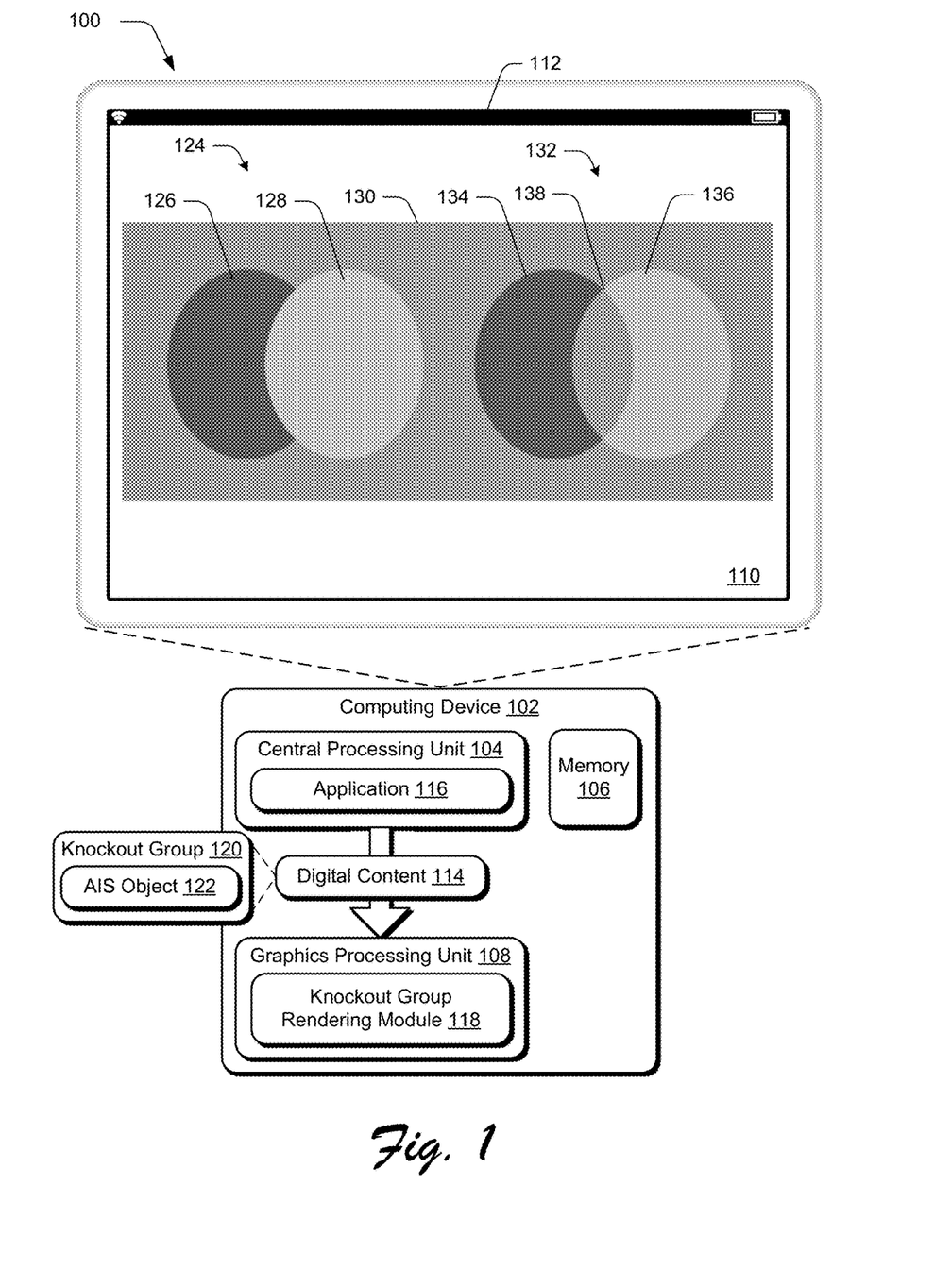
FIG. 1 is an illustration of an environment in an example implementation that is operable to employ techniques described herein.

FIG. 1 is an illustration of a digital medium environment 100 in an example implementation that is operable to employ rendering techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 7.

The computing device 102 is illustrated as including a central processing unit (CPU) 104, an example of a computer-readable storage medium as a memory 106, and a graphics processing unit (GPU) 108. The computing device 102 is also illustrated as rendering a user interface 110 on a display device 112 that includes digital content 114. Other examples of rendering are also contemplated, such as printing.

The CPU 104 represents electronic circuitry typically implemented via an integrated circuit within the computing device 102 that carries out the instructions of a computer program by performing the basic arithmetic, logical, control and input/output (I/O) operations specified by the instructions. A CPU 104 is also referred to as a processor, more specifically to its processing unit and control unit (CU), distinguishing these core elements of the computing device 102 from external components such as memory 106 and I/O circuitry.

The GPU 108 is a specialized electronic circuit designed to rapidly manipulate and alter memory to accelerate the rendering of digital images in a framebuffer for output to the display device 112. The GPU 108 is designed for increased efficiency in manipulating and rendering digital content 114 (e.g., computer graphics and image processing) through a highly parallel structure. This structure makes the GPU 108 more efficient than the general-purpose CPU 104 for algorithms where the processing of large blocks of data is done in parallel. The GPU 108 may be implemented as part of the computing device 102 in a variety of ways, such as on a video card, embedded on a motherboard, as part of a die that also contains the CPU 104, and so on.

The central processing unit 104 is illustrated as communicating digital content 114 (e.g., a digital image, digital document, etc.) as originating through execution of an application 116 for rendering by a knockout group rendering module 118 of the graphics processing unit 108. The digital content 114 in this example includes a knockout group 120 having an AIS object 122, i.e., object in which AIS is "on." As a result, an amount of opacity coverage of pixels may be specified for objects within the knockout group 122, e.g., as alpha values between zero and one where zero is transparent and one is completely opaque. The knockout group rendering module 118 is configured to address rendering of the AIS object 122 (which may be representative of one or more AIS objects) by the GPU 108, which is not possible using conventional techniques.

An example of a first knockout group 124 is shown as rendered as part of the user interface 110 in which AIS is not enabled, i.e., set to "off", and thus follows previous techniques that are usable by the GPU 108 to render the group. This also exhibits conventional limitations in rendering knockout groups that did not support AIS by the GPU 108. The first knockout group 124 includes first and second objects 126, 128 that overlap, one to another and are fully opaque (i.e., alpha value of "1"). The first and second objects 126, 128 are said to "knockout" or obscure underlying objects and background 130 in the order in which the objects are rendered. The first and second objects 126, 128 are rendered in the user interface 110 in a particular sequence (e.g., the first object 126 and then the second object 128). Any other objects in the user interface 110 that are already rendered forms a background, i.e., are rendered before the first and second objects 126, 128 are rendered. For example, the first knockout group 124 is rendered such that the first and second objects 126, 128 completely obscure the underlying objects and background 130 by replacing the underlying colors with the colors of the respective first and second objects 126, 128 and/or backdrop specified as part of the knockout group 124.

The first and second objects 126, 128 form the first knockout group 124, where a stacking order is the order in which the objects are specified and rendered, bottommost object first. Thus, each of the objects in a knockout group can potentially contribute to a rendered result, depending on respective colors and shapes. For example, objects A, B and C may form one knockout group, where C overlays B and B overlays A, which in turn overlays the initial backdrop. Alternatively, one or more of the objects A, B, C can each form different knockout groups. For example, objects A and B may form one knockout group (a parent knockout group) and object C may form another knockout group (a child knockout group). Digital content 114 may be rendered in a variety of ways by the graphics processing unit 108, e.g., as a plurality of pixels by the display device 112 in which each pixel represents a color value of the object. Other rendering examples include printing to a physical medium, e.g., paper.

Figure 3:
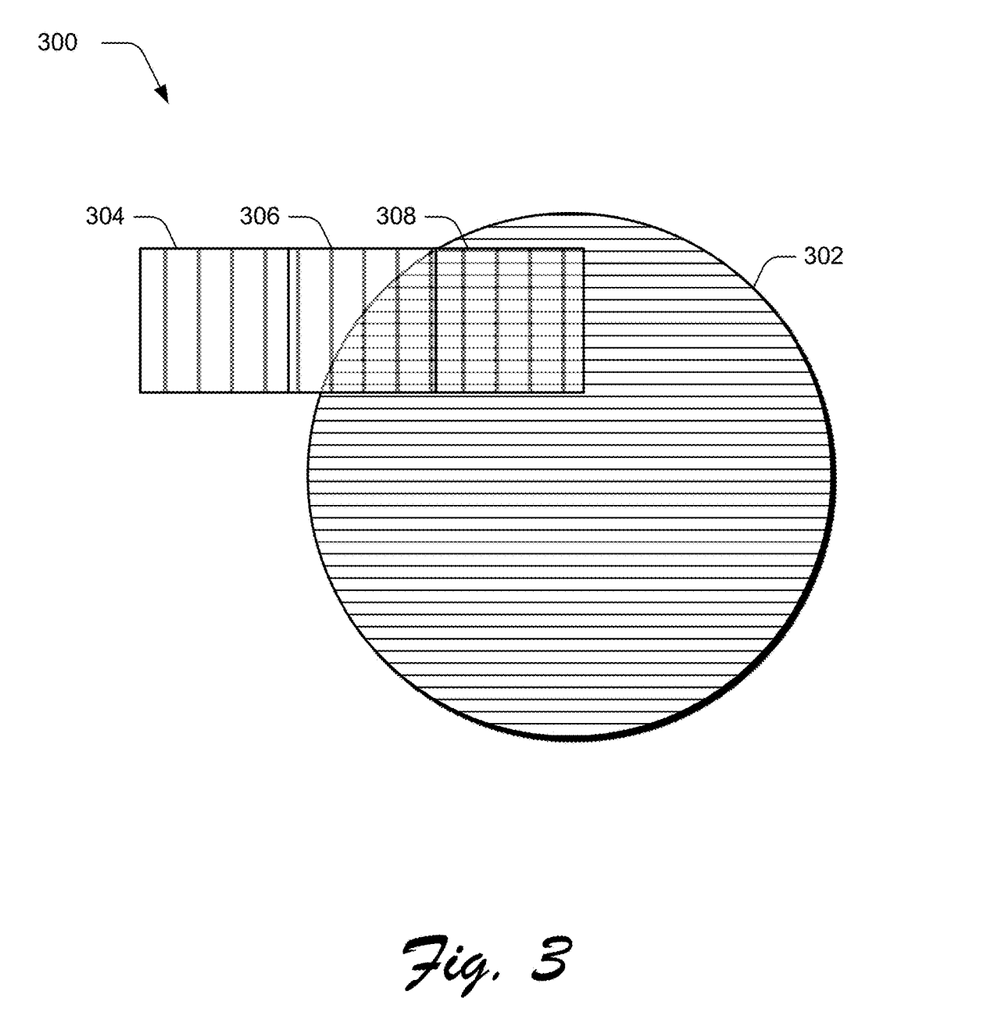
FIG. 3 is an example of spatial coverage based on overlap of a shape at a respective pixel.

An object in a knockout group may completely or partially overlap a given pixel when rendered, which is referred to as "spatial coverage" in the following. As shown in the example implementation 300 of FIG. 3, for instance, a portion of an example rendered digital content 114 is shown in which an object 302 in a knockout group does not cover pixel 304, partially covers a pixel 306, and fully covers a pixel 308. In FIG. 3, the covered portions of pixels 306 and 308 are shown for descriptive purposes and are not necessarily visible (i.e., the covered portions of pixels 306 and 308 are completely obscured by the object 302 when rendered). As illustrated, the shape of the object 302 influences the visibility of underlying objects where the object 302 completely or partially overlaps the underlying objects, as in pixels 306 and 308. Therefore, the color of each pixel 304, 306, 308 is configured to account for the coverage of the object 302 when rendered. For example, pixel 304 shows the backdrop color, pixel 306 shows a combination of the background color and the color of the object 302, and pixel 308 shows only the color of the object 302.

To account for the coverage of an object at a given pixel, conventional rendering techniques typically rely on multi-sampled anti-aliasing (MSAA) to handle fractional spatial values of objects at a pixel. Multi-sampling logically divides a pixel into sub-pixels, and spatial values are indirectly computed based on the number of sub-pixels covered by an object. For example, with a multi-sampling factor of eight, an object covering four sub-pixels is said to have a spatial value of 4/8 (or approximately 0.5) and an object covering two sub-pixels is said to have a spatial value of 2/8 (or approximately 0.25). The coverage resolution, however, is limited to the number of sub-pixels. In other words, with MSAA, partial coverage of sub-pixels is not considered.

The following sequence of steps is executed for rendering every object with MSAA.
  a) Find the object's bounding box and tessellate the bounding box into two triangles;
  b) For every transparency group, initialize depth buffer (z) to a value "n." Note that the number "n" increases for every group;
  c) Use the bounding box's triangles to copy the current color data into another texture (T);
  d) Use the bounding box's triangles and replace with the knockout group's initial backdrop;
  e) Composite the object's triangles and set depth buffer values to "z=n+t;"
  f) Use the bounding box's triangles to copy back the object's backdrop from texture "T" wherever "z=n;" and
  g) Reset pixels drawn with "z=n+t" to "z=n."

Using this conventional technique, each time an object is rendered by a computing device, the backdrop of the object is temporarily copied out and replaced with group's initial backdrop. Then, the object is rendered in multi-sampled mode at a higher depth than the existing depth. Each of the sub-pixels that are not changed after the object has been rendered are restored with the data from the texture initially copied out. To achieve this, hardware depth tests are used by the computing device, i.e., "z buffering" to manage image depth in which depth values are stored in a buffer. In instances in which a knockout group is nested (one or more levels deep) within another knockout group, the group's depth "n" represents the shape (i.e., coverage) of the group after each of the knockout group's constituent objects are composited. This information is used while compositing the group with its parent. Variants of the above described technique are also employed, e.g., objects may be rendered using progressively decreasing depths rather than increasing depth.

Dependency of conventional rendering techniques on multi-sampling increases the storage requirement for the digital content 114 being rendered. For example, multi-sampling of the user interface 110 for rendering by the display device 112 (and any associated textures/buffers like stencil and depth buffers) involves multiplying the number of pixels to be rendered by "N" times ("N" being the multi-sampling factor). A typical value of "N" is 8. However, on some GPU hardware, a multi-sampling factor of sixteen is also possible (which further doubles the memory requirements). Not only do memory requirements expand, but the number of pixels to be processed also expands "N" times (e.g., when per sample shading is used), which drastically reduces rendering performance by the GPU. While there are techniques that process fewer than "N" pixels (a lesser number of sub-pixels per pixel), such techniques compromise accuracy. This overuse of memory can prevent simultaneous processing of several complicated artworks, especially when the underlying color space is CMYK, which inherently utilizes more memory than RGB. As stated earlier, the involvement of depth buffer, depth tests and texture copies further reduce processing speed.

In contrast to MSAA, techniques are described in the following which support rendering of knockout groups on the GPU 108 with increased efficiency through use of a texture stored as part of a framebuffer of the GPU 108. The texture is used to store coverage of pixels by objects in the knockout group, which may include spatial coverage as described in relation to FIG. 3 and opacity coverage as specified by an alpha value. Thus, these techniques support use of AIS functionality by storing opacity coverage as part of the texture in the framebuffer, which is not possible in conventional GPUs. An example of rendering of a knockout group that supports AIS by the GPU 108 is illustrated by a second knockout group 132. The second knockout group 132 includes first and second objects 134, 136 in which an overlapping portion 138 includes a contribution of color from both objects to pixels in the overlapping portion 138. This is contrasted with the first knockout group 124 with AIS off in which the overlapping portion is limited to a contribution of color to the second object 128, which follows conventional techniques in which AIS functionality is not supported by a GPU.

To do so, a three-stage process is employed by the knockout group rendering module 118 of the GPU 108, which includes (1) color blending; (2) shape blending; and (3) shape recording. In the color blending stage, a value of "shape" (i.e., coverage) is set to full coverage (e.g., "one") at each of the pixels and is composited with a knockout group's initial backdrop. As described above, coverage refers to opacity coverage (e.g., an amount that an object is "see through") and spatial coverage which is an amount of a pixel that is overlapped by an object. In the shape blending stage, the actual shape of the object (i.e., spatial coverage) is used to determine final color to be rendered based on the knockout group. In the shape recording stage, the object's shape (coverage) is propagated to higher up the parent hierarchy, i.e., other objects, knockout groups, and so forth that are to be rendered "above" this shape. Further, in the techniques described herein this is performed to render objects with AIS as well, which is not possible by conventional GPUs.

Some sources of alpha (e.g., an object's transparency) are stored as part of the object's color. Accordingly, in the techniques described herein these alpha values are separated from color values for treatment as shape (as AIS is on), i.e., an amount of coverage. To do so, the object's pre-multiplied color is divided by a corresponding alpha value. This sets the object's alpha value as "one" and each of the other color channels free of an effect of alpha. This color value is then used in the color blending stage. There are exceptions to this approach which are discussed in greater detail in the following Implementation Example section.

For the shape blending stage, there are now an increased number of contributions to shape, i.e., "coverage" at a pixel. This is because along with the existing shape of an object (i.e., spatial coverage), the alpha values that are divided in the previous stage are now also part of shape, i.e., the opacity coverage at a pixel. The combined shape is used for the shape blending stage. Finally, the combined shape is also recorded in the shape recording stage and contributes in achieving knock out behavior "higher up" the parent hierarchy. This technique is applicable for both RGB and CMYK color spaces with a near zero performance penalty when including computations for AIS by the GPU 108.

As a result, the techniques described herein support rendering of knockout groups on the GPU 108 without the involvement of multi-sampling, depth buffer and texture copies. This reduces usage of GPU 108 memory and renders complicated artworks with increased efficiently and correctness over MSAA (which does not account for partial coverage of sub-pixels). Further, additional hardware operations of the GPU 108 (e.g., dual source blending) may be used to speed-up some operations, as is described in further detail below.

Figure 4:
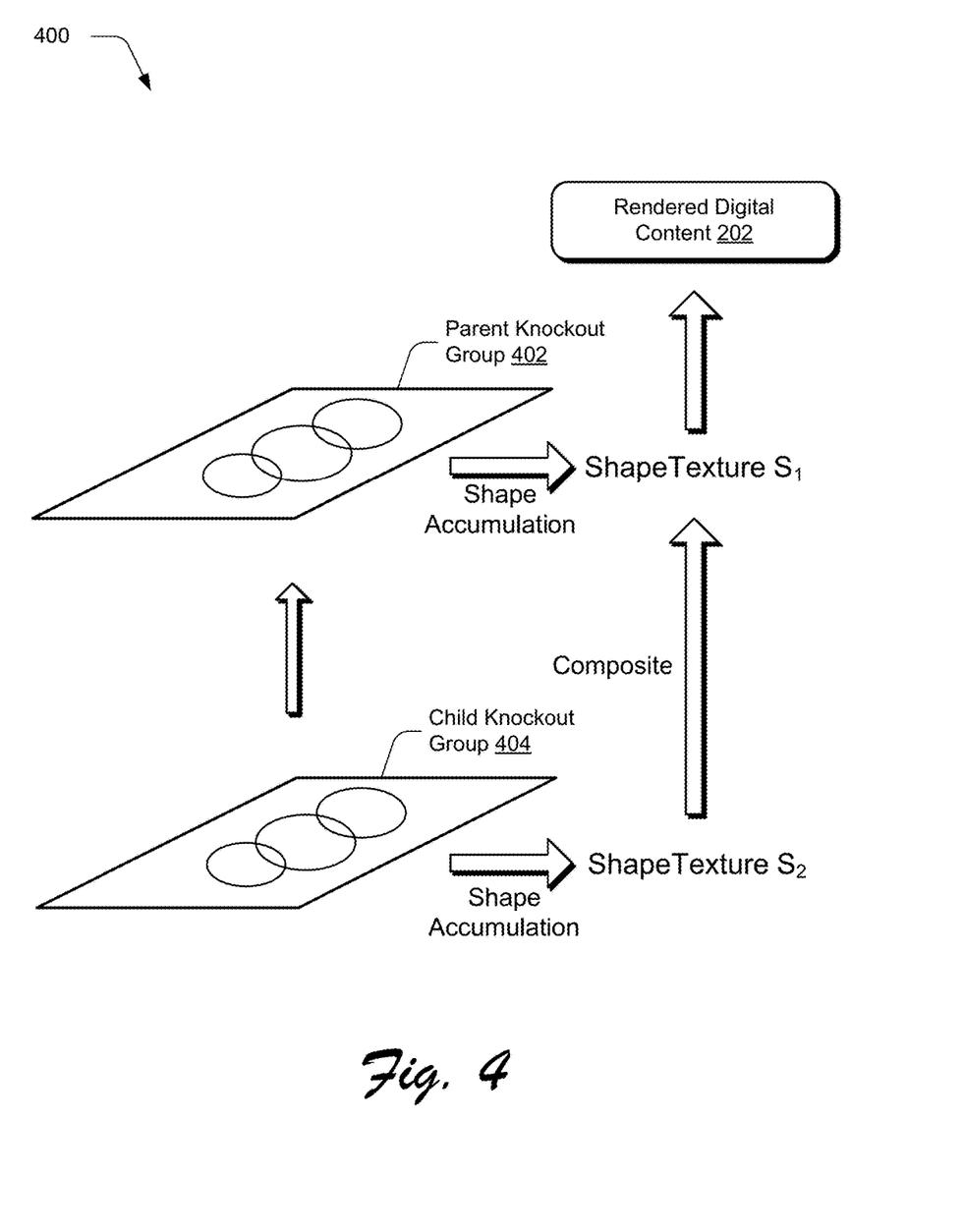
FIG. 4 is an overview of an example process for rendering knockout groups.

FIG. 4 is an overview of an example process 400 for rendering knockout groups. Data representing a texture "ShapeTexture" (e.g., S1 and S2) is instantiated in memory of the GPU 108 by the knockout group rendering module 118 for each knockout group (e.g., a parent knockout group 402 and a child knockout group 404) to achieve the knockout effect. A shape texture may be created by the knockout group rendering module 118 for each knockout group or for a non-knockout transparency group having a parent hierarchy that includes a knockout group.

As the objects in each group 402, 404 are rendered, the shape (i.e., coverage at each pixel) of the objects are accumulated with, and recorded into, the texture S1, S2 corresponding to the groups 402, 404. When each of the objects in the groups 402, 404 are rendered, the texture "ShapeTexture" contains coverage (i.e., "shape") data for the group (e.g., S1 for group 402 and S2 for group 404). The ShapeTexture is then used to composite the child group 402 with its parent 404 (if the parent is a knockout group) to produce a rendered result (e.g., S2 is composited with S1). The child group 404 is also an object of its parent group 402, and thus is composited into the parent group 402. Thus, S1 is complete after inclusion of S2. Further discussion of an implementation example in which AIS is supported as part of rendering of a knockout group is included in the following section and shown in corresponding figures.

Implementation Example

Figure 5:
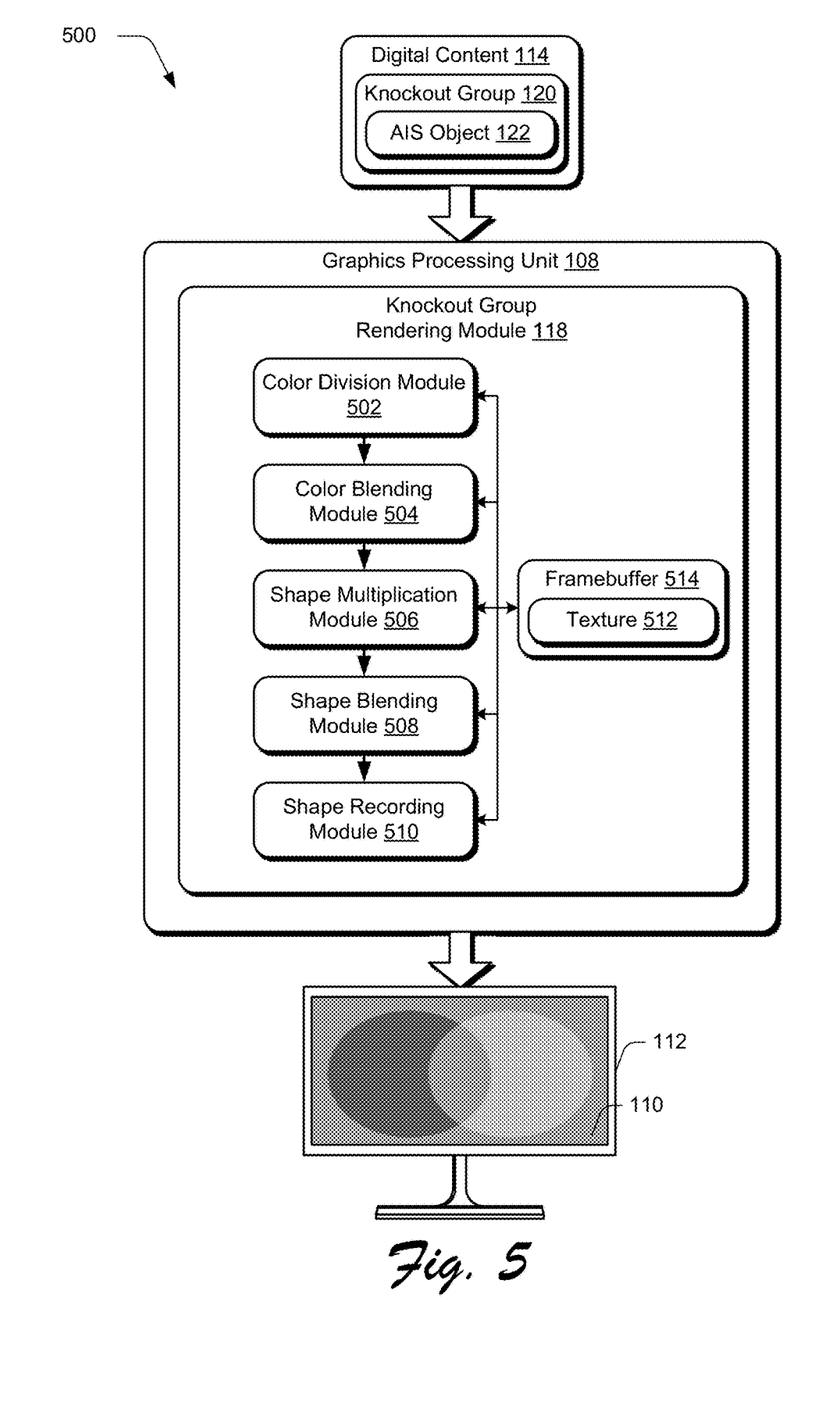
FIG. 5 depicts an example system showing operation of a knockout group rendering module of FIG. 1 as implemented by a graphics processing unit in greater detail to render objects in a knockout group to support alpha is shape (AIS).
Figure 6:
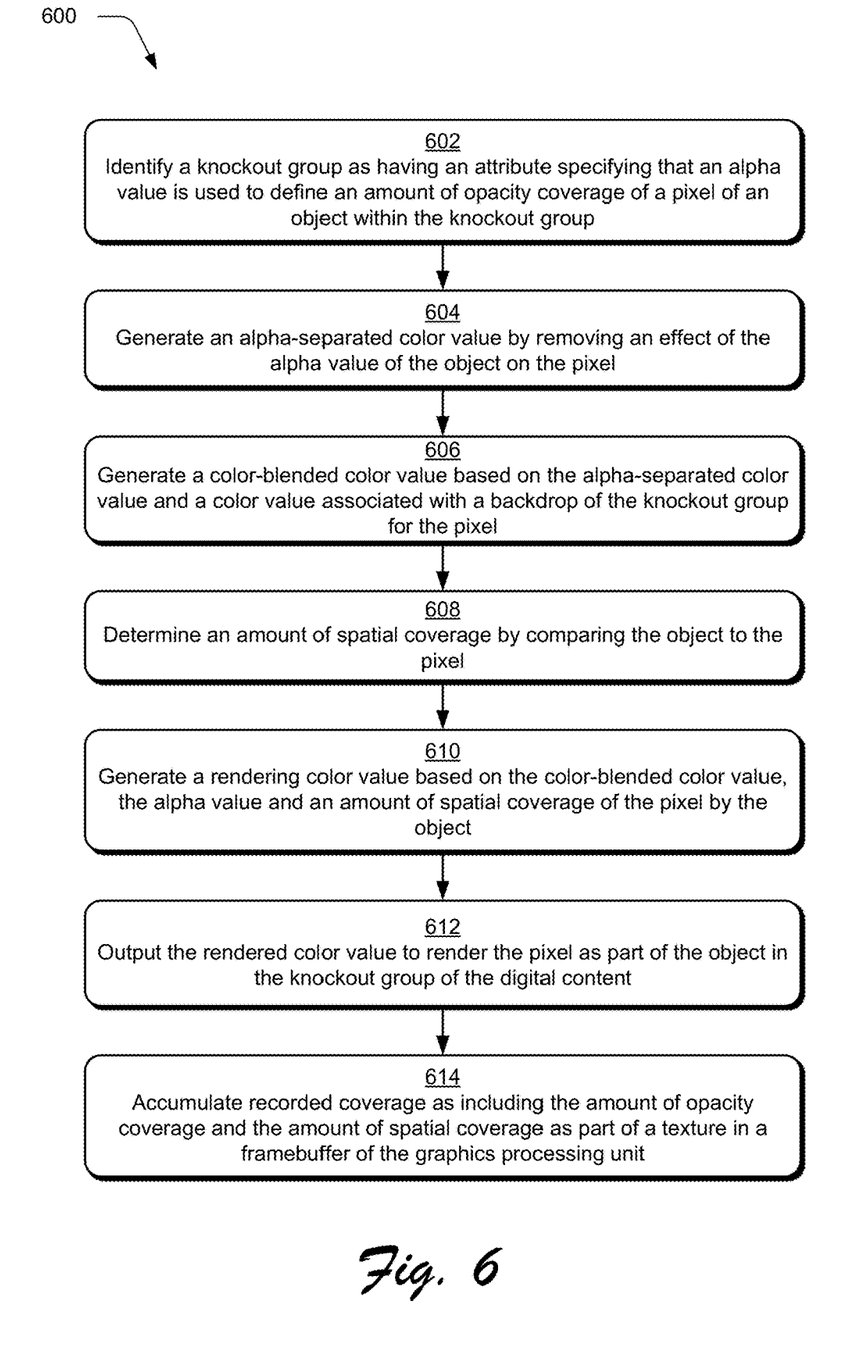
FIG. 6 is a flow diagram depicting a procedure in an example implementation of digital content rendering that supports Alpha Is Shape (AIS) as part of knockout groups.

FIG. 5 depicts an example system 500 showing operation of the knockout group rendering module 118 as implemented by the graphics processing unit 108 of FIG. 1 in greater detail to render objects in a knockout group to support alpha is shape (AIS). FIG. 6 depicts a procedure 600 in an example implementation of digital content rendering that supports Alpha Is Shape (AIS) as part of knockout groups. The following discussion refers interchangeably to FIGS. 1-6.

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks.

The knockout group rendering module 118 as illustrated includes a color division module 502, color blending module 504, shape multiplication module 506, shape blending module 508, and shape recording module 510. As previously described, the knockout group rendering module 118 employs a texture 512 (also referred to as "ShapeTexture" in the following discussion) to achieve the knockout effect and as a result does not use multi-sampling or a depth buffer, thereby preserving computational and memory resources. The knockout group rendering module 118 instantiates this texture 512 in memory of the GPU 108 (e.g., a framebuffer 514) for each knockout group or a non-knockout transparency group having a parent hierarchy that also includes a knockout group. As the objects in a group are rendered by the knockout group rendering module 118, a corresponding "shape" (i.e., coverage) is stored as part of this texture 512 as previously described in relation to FIG. 4. This includes opacity coverage based on an alpha value and spatial coverage based on an amount of a pixel that is overlapped by an object. When each of the objects in the knockout group are finished rendering, the texture 512 (ShapeTexture) contains the group's shape data, which defines coverage of objects at each of the pixels. This data is then used by the knockout group rendering module 118 to composite this group with its parent, if the parent is knockout group.

To begin, a knockout group is identified by the knockout group rendering module 118 of the GPU 108 as having an attribute that specifies that an alpha value is used to define an amount of opacity coverage of a pixel of an object within the knockout group (block 602). The knockout group rendering module 118, for instance, may identify a Boolean flag associated with the knockout group 120 indicating AIS is "on."

In response, the knockout group rendering module 118 instantiates a texture 512 in memory of the framebuffer 514 (ShapeTexture "S") for each transparency group having a parent hierarchy that includes a knockout group (i.e. a group with a knockout parent or knockout grandparent or so on). The texture 512, for instance, is included as one of the attachments to the knockout group's framebuffer 514. As a convention, this may be implemented as a last attachment of the framebuffer 514. The texture 512 may be formatted in a variety of ways, e.g., using an OpenGL format such as "GL_R16" in which each shape value is represented using sixteen bits.

The knockout group rendering module 118 then renders the knockout group 120 of the digital content 114 that includes AIS objects 122 in three stages as previously described. These three stages include the following: (1) color blending; (2) shape blending; and (3) shape recording. Functionality of these stages is represented for color blending by the color division module 502 and color blending module 504, for shape blending by the shape multiplication module 506 and shape blending module 508, and by the shape recording module 510 for the shape recording stage, respectively, as part of the knockout group rendering module 118.

As objects are rendered by the knockout group rendering module 118, corresponding color data is composited with the group's blending backdrop, e.g., which is provided as an input texture to a GLSL shader assuming that the shape of the object being rendered at each of the pixels is "one." The blending backdrop is the group's initial backdrop for knockout groups and immediate backdrop for non-knockout groups. An initial backdrop refers to a backdrop at a start of the knockout group whereas the immediate backdrop refers to a backdrop just before an object is rendered. For example, if a knockout group includes three objects, A, B, and C to be rendered in that Z-order, each of these objects has the same initial backdrop. Object A's immediate backdrop is the same as the initial backdrop, object B's immediate backdrop is A rendered over the initial backdrop, and object C's immediate backdrop is A and B rendered over the initial backdrop. Thus, the initial backdrop may be considered a group property whereas the immediate backdrop is specific to an object and is based on the most recent rendering just before that object is rendered.

To do so, an alpha-separated color value is generated by removing an effect of the alpha value of the object on the pixel (block 604) by the color division module 502. When AIS is on, for instance, the alpha value used in color composition is also set to one along with shape (i.e., coverage) by the knockout group rendering module 118. Color data used by a graphics processing unit 108 is typically stored in pre-multiplied format, e.g., RGBA data is stored as "AR," "AG," and "AB" for the color channels and "A" which is alpha for the knockout group as a whole. Accordingly, the color division module 502 is first employed by the knockout group rendering module 118 to divide each of the color channels by a corresponding alpha value to achieve the effect of alpha equal to one before color blending by the color blending module 502. In instances in which the GPU 108 stores non-pre-multiplied color, then values of the alpha channel "A" are divided and not the color channels. Before division, this alpha is stored by the color division module 502 as another variable, e.g., "ShapeFromAlpha," in memory of the knockout group rendering module 118.

In some instances, an external source of alpha may be encountered which is not a part of an object's color. Examples of these are opacity mask, anti-aliasing functionality, or specified application of a constant alpha to an object. These alpha values also "become shape" (i.e., coverage) when AIS is on. Because these sources are external, the color division module 502 is not employed in such instances to divide an object's color by these alpha values. However, these alpha values are multiplied to the variable "ShapeFromAlpha" generated as described above in the later stages as further described below.

In a scenario involving transparency groups having AIS set as "on," there is an exception to this division stage employed by the knockout group rendering module 118. The alpha stored in the knockout group's color does not become shape (i.e., is not set as coverage) even when AIS is on. This is because this alpha originates from the color of knockout group's children and thus is already considered "shape" (coverage) in instances in which the child knockout groups have AIS "on." Even in that case, however, additional operations are not required while compositing groups as objects specify whether their alpha is treated as shape.

To summarize functionality involved to provide support for AIS by the knockout group rendering module 118 of the GPU 108, each source of alpha is addressed as "shape" (i.e., coverage) when AIS is on. In the case of transparency groups, this includes only the external alpha sources (i.e., internal sources like alpha in color texture does not become shape as explained above) while in case of leaf objects (i.e., text, image or path) of an object group this includes all available sources of alpha. Values of alpha are removed from object's color channels and stored separately in the variable "ShapeFromAlpha" by the color division module 502. Note that when there are multiple sources, there individual values are multiplied to obtain the final value of this variable.

A color-blended color value is then generated based on the alpha-separated color value and a color value associated with a backdrop of the knockout group for the pixel (block 606). In this way, the color-blended color value is generated with an opacity free from an effect of alpha to incorporate an effect of color of a backdrop specified as part of the knockout group.

A determination is then made as to an amount of spatial coverage by comparing the object to the pixel (block 608). A rendering color value is then generated based on the color-blended color value, the alpha value, and an amount of spatial coverage of the pixel by the object (block 610). These stages are implemented by the shape multiplication module 506 and the shape blending module 508 as follows.

In the shape blending stage, the spatial coverage (i.e., "actual shape") of the object is addressed as part of rendering by the knockout group rendering module 118. For example, assume an object's shape (or coverage) is given by "C" at a particular pixel. The following expression may then be used to compute a rendered ("final") color value of the pixel for the knockout group:

$$P = C * \text{ShapeFromAlpha} * P_1 + (1 - C * \text{ShapeFromAlpha}) * B$$

where "P" is the rendered color value of the pixel and "C" is the pixel coverage of the object being drawn. The value "$P_1$" is the color value obtained after the color blending stage as described above, "B" is the color of the pixel in the framebuffer 514 as taken from the texture 512 (i.e. the immediate backdrop or the color of the object underneath). The value "ShapeFromAlpha" is also defined above.

The rendered color value of a pixel is a weighted interpolation of an existing color and the color of the object's pixel being drawn. The new object replaces (or knocks out) the fraction equal to its "shape" (i.e., coverage*ShapeFromAlpha). If the new object has a shape value of one, the expression reduces to "$P=P_1$," i.e., the rendered color value of the pixel is completely knocked out.

When AIS is on, "C" is defined as a multiplication of coverage and "ShapeFromAlpha" by the shape multiplication module 506, which is a combination of opacity and spatial coverage in this example. Thus, whatever the alpha value is defined at the start of object rendering, the alpha value is set to "one" for the color blending stage. Thereafter, the alpha value is employed as an additional contributor to "shape" (coverage) during shape blending by the shape blending module 508. In this way, the knockout group rendering module 118 of the GPU 108 may render AIS object 122 as part of digital content 114, which is not possible using conventional GPU rendering techniques. The rendered color value is then output to render the pixel as part of the object in the knockout group of the digital content (block 612), such as for display in a user interface by the display device 112, printed on a physical medium, and so forth.

Additionally, the recorded coverage is accumulated as including the amount of coverage (e.g., spatial and opacity) as part of the texture in a framebuffer of the graphics processing unit 108 (block 614). This is the shape recording stage as described above, which is used by the shape recording module 510 to propagate colors of object with groups "up the hierarchy" when including other knockout groups as described in relation to FIG. 4. To do so, the shape recording module 510 records shape of an object in a knockout group into its parent group as the parent knockout group uses this consolidated shape as part of rendering. In these cases, the shape "C" of objects (during rendering) is accumulated as texture 512 (ShapeTexture) in the framebuffer 514. Multiple objects in a group can overlap each other. Thus the final shape of a group at any pixel is the result of contribution of each of the objects that partially or fully occupy that pixel as shown and described in relation to FIG. 4.

The following expression, for instance, may be used by the shape recording module 510 for shape accumulation:

$$S_f = \text{Union}(S_e, C * \text{ShapeFromAlpha})$$

where "$S_f$" is the final shape at a pixel after the current object's composition, "$S_e$" is the existing shape at the pixel before the current object's composition, and "C" is the shape of the current object at the pixel. The value "ShapeFromAlpha" is defined as described above. As previously described, when the Boolean flag "AIS" is set as "on," the value "C" is based on a multiplication of object's coverage data and additional shape contribution that originates from the alpha value. This allows propagation of the AIS effect to higher up the parent hierarchy. Once each the objects inside the group are composited by the knockout group rendering module 118, the knockout group's shape is present inside the texture 512 (ShapeTexture "S") in the framebuffer 514 and is used to composite the group with its parent (if parent is knockout).

Example System and Device

Figure 7:
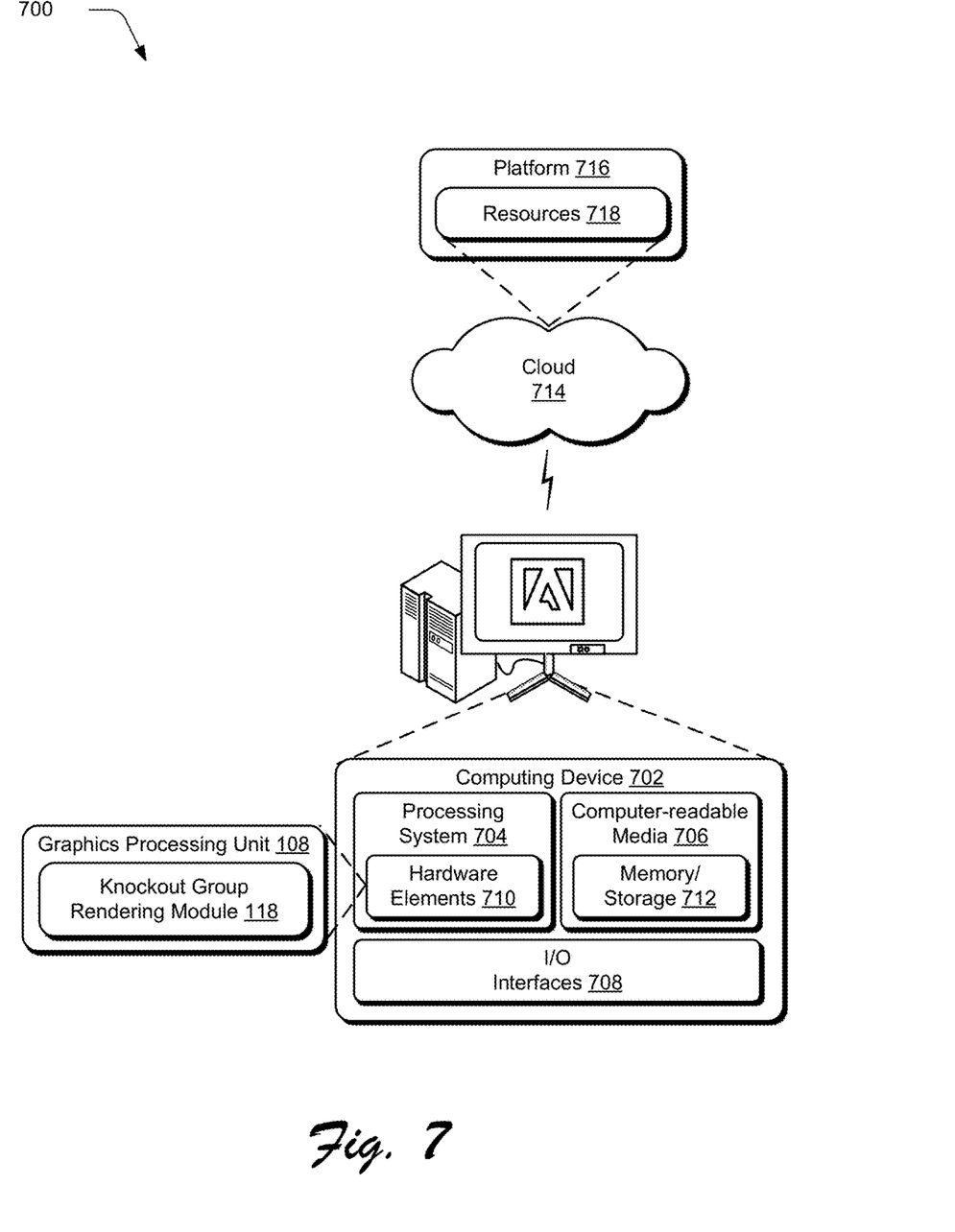
FIG. 7 illustrates an example system including various components of an example device that can be implemented as any type of computing device as described and/or utilize with reference to FIGS. 1-6 to implement embodiments of the techniques described herein.

FIG. 7 illustrates an example system generally at 700 that includes an example computing device 702 that is representative of one or more computing systems and/or devices that may implement the various techniques described herein. This is illustrated through inclusion of the graphics processing unit 108 and knockout group rendering module 118. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data.

Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment for digital content rendering by a graphics processing unit, a method comprising:
   identifying, by the graphics processing unit, a knockout group as having an attribute specifying that an alpha value is used to define an amount of opacity coverage of a pixel of an object within the knockout group;
   generating, by the graphics processing unit, an alpha-separated color value by removing an effect of the alpha value from at least one color channel of the object on the pixel and storing the alpha value in memory of the graphics processing unit;
   generating, by the graphics processing unit, a color-blended color value based on the alpha-separated color value and a color value associated with a backdrop of the knockout group for the pixel;
   determining, by the graphics processing unit, an amount of spatial coverage of the pixel by the object by comparing overlap of the object in relation to the pixel, the amount of spatial coverage is stored as part of a texture in a framebuffer of the graphics processing unit;
   generating, by the graphics processing unit, a rendering color value based on the color-blended color value, the alpha value stored in the memory, and the amount of spatial coverage of the pixel by the object; and
   outputting, by the graphics processing unit, the rendered color value to render the pixel as part of the object in the knockout group of the digital content.

2. The method as described in claim 1, wherein the identifying by the graphics processing unit is based on an Alpha Is Shape (AIS) Boolean flag set for the knockout group.

3. The method as described in claim 1, wherein the generating of the alpha-separated color value includes dividing color values of the at least one color channel by the alpha value.

4. The method as described in claim 3, wherein the generating includes storing the at least one alpha value in the memory of the graphics processing unit for use as part of generating of the rendering color value.

5. The method as described in claim 3, wherein the removing is not performed for an alpha value defined for the knockout group as a whole as part of the digital content.

6. The method as described in claim 1, wherein the knockout group is defined using non-pre-multiplied color values and the removing includes dividing the alpha value of the knockout group as a whole.

7. The method as described in claim 1, wherein the generating of the alpha-separated color value is further based at least in part on an external source of alpha.

8. The method as described in claim 7, wherein the external source includes an opacity mask, anti-aliasing functionality, or a specified application of a constant alpha.

9. The method as described in claim 1, wherein the knockout group is configured for rendering by the graphics processing unit such that an appearance of another object or background in the digital content that is not included as part of the knockout group is obscured by the object.

10. The method as described in claim 1, wherein the outputting includes recording coverage as including the amount of opacity coverage and the amount of spatial coverage as part of the texture in the framebuffer of the graphics processing unit.

11. The method as described in claim 10, further comprising accumulating the recorded coverage of the object of the knockout group with coverage of another object of a parent knockout group.

12. In a digital medium environment for digital content rendering by a graphics processing unit, a system comprising:
  a color division module implemented at least partially in hardware of the graphics processing unit to generate an alpha-separated color value by separating an effect of an alpha value from a color channel of the object on the pixel and storing the alpha value in memory separately from the alpha-separated color value;
  a color blending module implemented at least partially in hardware of the graphics processing unit to generate a color-blended color value based on the alpha-separated color value and a color value associated with a backdrop of the knockout group for the pixel;
  a shape multiplication module implemented at least partially in hardware of the graphics processing unit to determine an amount of spatial coverage of the pixel by the object by comparing overlap of object in relation to the pixel, the amount of spatial coverage is stored as part of a texture in a framebuffer of the graphics processing unit;
  a shape blending module implemented at least partially in hardware of the graphics processing unit to generate a rendering color value based on the color-blended color value, the alpha value stored in the memory, and the amount of spatial coverage of the object in relation to the pixel; and
  a shape recording module implemented at least partially in hardware of the graphics processing unit to record coverage as including the amount of opacity coverage and the amount of spatial coverage for the pixel as part of the texture in the framebuffer of the graphics processing unit.

13. The system as described in claim 12, wherein the color division module is configured to generate the alpha-separated color value by dividing a color values of the color channel by the alpha value.

14. The system as described in claim 13, wherein the color division module is configured to store the alpha value in the memory of the graphics processing unit for use as part of generating of the rendering color value by the shape blending module.

15. The system as described in claim 12, wherein the knockout group is configured for rendering by the graphics processing unit such that an appearance of another object or background in the digital content that is not included as part of the knockout group is obscured by the object.

16. The system as described in claim 12, wherein the generation of the alpha-separated color value by the color division module is further based at least in part on an external source of alpha.

17. A graphics processing unit comprising:
  means for rendering a knockout group included as part of digital content, the knockout group having an attribute that specifies an alpha value defines an amount of opacity coverage of a pixel of an object within the knockout group, the knockout group rendering means including;
    means for generating an alpha-separated color value by separating an effect of the alpha value of the object on a color channel of the pixel and storing the alpha value in memory;
    means for generating a color-blended color value based on the alpha-separated color value and a color value associated with a backdrop of the knockout group for the pixel; and
    means for determining, by the graphics processing unit, an amount of spatial coverage of the pixel by the object by comparing overlap of the object in relation to the pixel, the amount coverage of spatial coverage is stored as part of a texture in a framebuffer of the graphics processing unit; and
    means for generating a rendering color value based on the color-blended color value, the alpha value stored in the memory, and the amount of spatial coverage of the object in relation to the pixel.

18. The graphics processing unit as described in claim 17, wherein the knockout group is configured for rendering by the graphics processing unit such that an appearance of another object or background in the digital content that is not included as part of the knockout group is obscured by the object.

19. The graphics processing unit as described in claim 17, wherein the generating of the alpha separated color value includes dividing color values of the at least one color channel by the alpha value.

20. The graphics processing unit as described in claim 19, wherein the removing is not performed for an alpha value defined for the knockout group as a whole as part of the digital content.

21. The graphics processing unit as described in claim 17, wherein the generating of the alpha-separated color value is further based at least in part on an external source of alpha.

* * * * *